United States Patent [19]

Bradley

[11] Patent Number: 4,469,202
[45] Date of Patent: Sep. 4, 1984

[54] BRAKE CONTROL MECHANISMS FOR USE WITH TRAILERS

[75] Inventor: Harry S. Bradley, Bradford, England
[73] Assignee: H & K Bradley (Trailer Equipment) Limited, Bingley, England
[21] Appl. No.: 362,207
[22] Filed: Mar. 26, 1982
[30] Foreign Application Priority Data Nov. 24, 1981 [GB] United Kingdom ............... 8135370

[51] Int. Cl.³ ..................... B60T 7/20; F16H 53/06
[52] U.S. Cl. ................................ 188/112 R; 74/160
[58] Field of Search ............... 188/112 R, 3 R, 106 R, 188/142, 149; 74/520, 160

[56] References Cited

FOREIGN PATENT DOCUMENTS

| 2225828 | 12/1973 | Fed. Rep. of Germany ... 188/112 R |
| 2387145 | 12/1978 | France .......................... 188/112 R |
| 1150076 | 4/1969 | United Kingdom ............ 188/112 R |
| 1172810 | 12/1969 | United Kingdom ............ 188/112 R |

Primary Examiner—Bruce H. Stoner, Jr.
Assistant Examiner—Robert J. Oberleitner
Attorney, Agent, or Firm—W. Thad Adams, III

[57] ABSTRACT

A brake control mechanism is adapted to operate trailer brakes in an overrun manner, and to incorporate a handbrake mechanism. A draw shaft of a towing coupling acts on a first arm of an overrun brake link, which has a second arm on which there is provided a connection point for a brake rod. When the brakes are actuated in an overrun manner, the brake link is activated by the draw shaft and pivots about a first pivot point. When the handbrake mechanism is activated, the overrun brake link is caused to pivot about a second pivot point, such that the maximum travel of the aforementioned connection point for the brake rod is greater than in an overrun braking action. The overrun brake link is resiliently biased into a brake actuating position.

17 Claims, 3 Drawing Figures

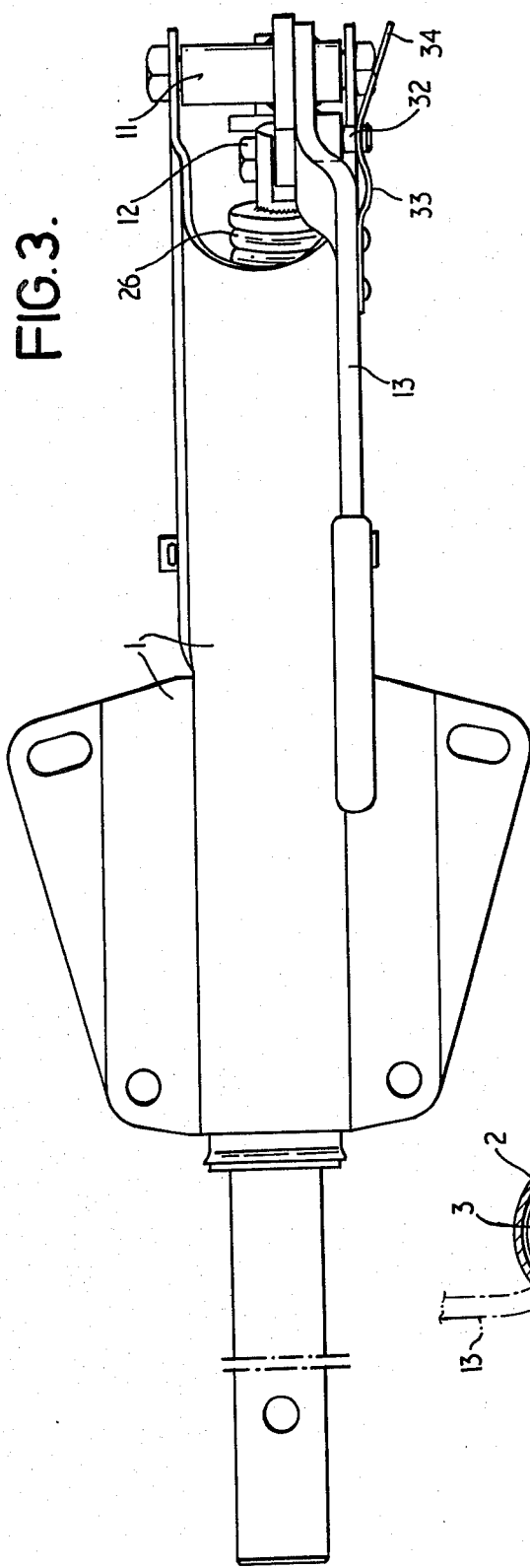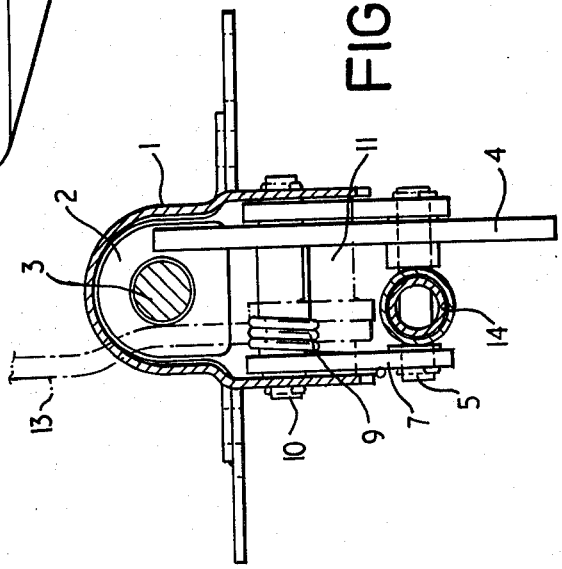

BRAKE CONTROL MECHANISMS FOR USE WITH TRAILERS

This invention relates to brake control mechanisms for use with trailers.

The design of brakes for trailers has met with a number of difficulties over the years, often due to conflicting requirements. Usually, it is desirable for trailer brakes to operate automatically in an overrun manner—i.e. to be actuated automatically when the towing vehicle slows down. On the other hand, it is desirable to be able to reverse a trailer without the trailer brakes operating. To meet this particular problem, there have been recently developed so-called "automatic reversing brakes" for trailers. Generally, such brakes are similar to conventional drum type brakes, except that, when the wheels are being reversed, the brake shoes automatically disengage themselves from the drum, so that the brakes cannot be applied. This greatly facilitates manoeuvring of a trailer where alternate forward and reverse manoeuvres are required.

However, one difficulty encountered with such automatic reversing brakes is that, when it is desired to park a trailer facing upwardly on a hill, the brakes will tend not to operate, responding instead as if the trailer were being reversed. To overcome this problem, it has been proposed to incorporate, in a handbrake mechanism for such trailers, an energy store. When the handbrake is applied, to apply the brakes initially, the energy store is activated such that, upon any tendency for the brake (shoes) automatically to disengage from the drums, the stored energy is used to apply further force to the brake mechanism, such that this tendency is counteracted and the brakes remain on.

Typically, such energy stores comprise one or more springs arranged behind a towing coupling, and incorporating a lost motion mechanism. Such energy stores are therefore generally in series with conventional towing coupling arrangements. They tend to occupy quite a lot of space, and to the average user, appear somewhat complicated to maintain and adjust. Preferred embodiments of the present invention aim to provide brake control mechanisms for use with trailers, which may be improved in these respects.

More generally, according to a first aspect of the present invention, there is provided a brake control mechanism for use with trailers, the mechanism comprising:

a first member having a connection point for a brake cable or the like and being arranged to co-operate with a push rod of a towing coupling to undergo first pivoting movement about a first pivot point, to actuate brakes in an overrun manner; and a handbrake mechanism arranged to cause the first member to undergo second pivoting movement about a second pivot point, such that the maximum travel of said connection point in said second movement is greater than that in said first movement, the handbrake mechanism including means for biasing said first member into a brake-actuating position.

Preferably, the brake control mechanism further comprises a second member which is mounted for pivoting movement about a third pivot point, the first member being pivotally secured to said second member at said first pivot point.

Advantageously, the first member may have a portion adapted to abut a pivot pin or the like of said third pivot point, such that when said portion so abuts said pivot pin, said second and third pivot points are substantially coincident.

The second member is preferably urged resiliently towards a rest position, and may be pivotally secured at said third pivot point to a housing of the brake control mechanism.

Preferably, the first member has a first arm which is arranged to co-operate with a push rod of a towing coupling, and a second arm on which said connection point is located.

The bias means may comprise a spring, and preferably comprises two telescopic or sliding members which are urged resiliently towards or away from one another. The bias means preferably comprises two telescopic members urged apart by a compression spring.

In a particularly advantageous arrangement, the bias means may have a toggle action, and may act substantially through said first pivot point. Then, there may be provided at said first pivot point an axle on which are mounted said first member and one end of the bias means.

Preferably, the first and second members and the bias means are housed, at least for the most part, within a housing of the brake control mechanism.

The handbrake mechanism preferably includes a handbrake lever. The arrangement may be such that, in use, the handbrake is "OFF" when the lever is generally upright and "ON" when the lever is generally horizontal. Alternatively, the handbrake mechanism may be arranged vice-versa.

The handbrake lever may be provided with means whereby it may be tied to a towing vehicle.

The invention also extends to a towing coupling arrangement provided with a brake control mechanism in accordance with the first aspect of the invention, and to a trailer provided with a brake control mechanism in accordance with the first aspect of the invention.

For a better understanding of the invention and to show how the same may be carried into effect, reference will now be made, by way of example, to the accompanying drawing, in which:

FIG. 2 is a sectional view on the line A—A of FIG. 1: and

FIG. 3 is a top plan view of the brake control mechanism.

Figure 1:
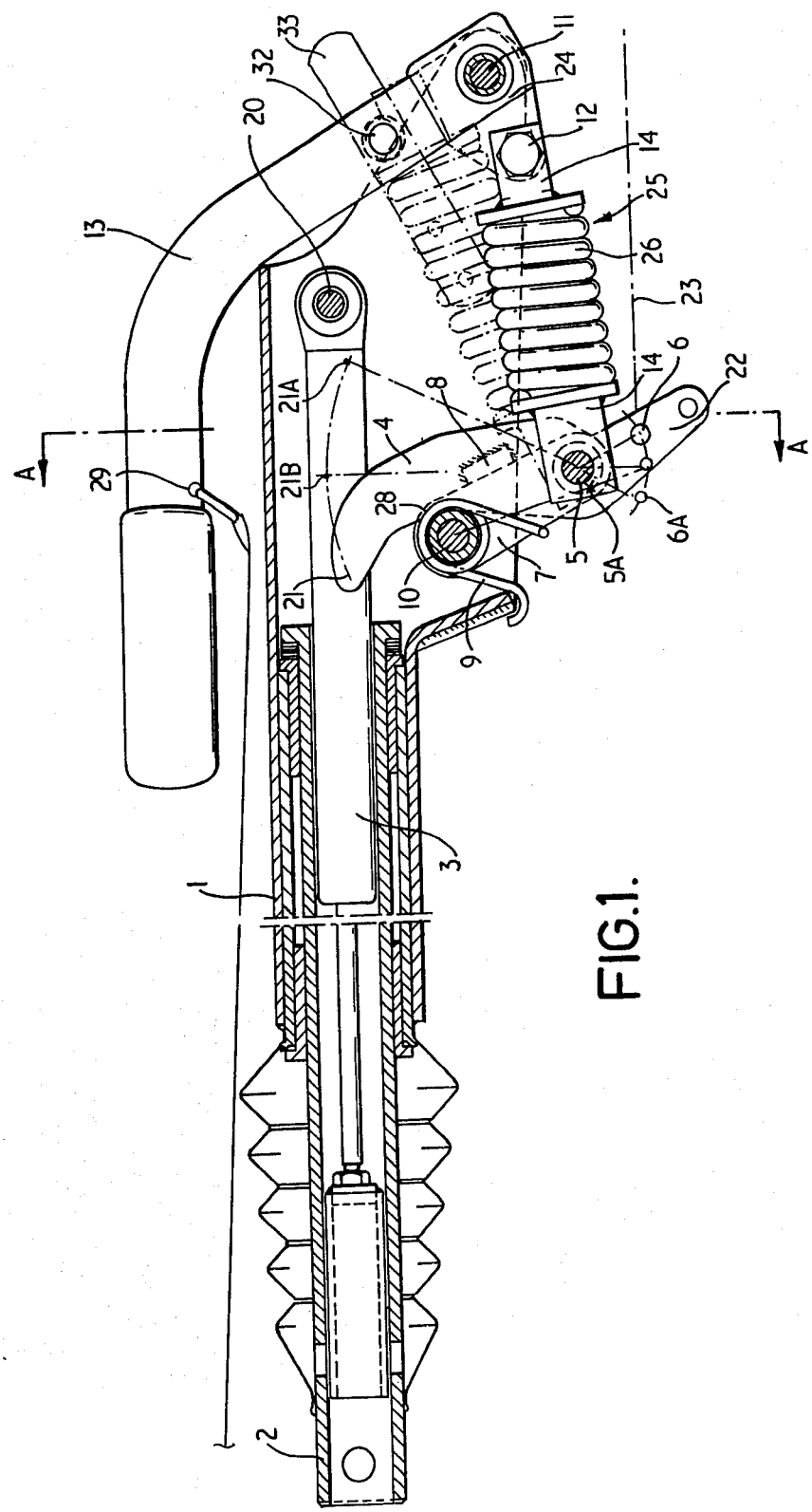
FIG. 1 is a longitudinal sectional view of a towing coupling for a trailer, provided with a brake control mechanism in accordance with the present invention.

The illustrated towing coupling, complete with brake control mechanism, is intended to be fitted to a trailer which incorporates automatic reversing brakes, the general mode of functioning of which has been outlined above. The towing coupling comprises a main housing 1 in which a draw shaft 2 is slidably mounted. The draw shaft 2 has a ball coupling head or a towing eye at its free end, and is connected to an hydraulic damper 3 which is arranged co-axially within the draw shaft 2, and is secured at 20 to the main housing 1. The hydraulic damper 3 damps movement of the draw shaft 2, and thus far, the towing coupling is of a fairly conventional construction.

An overrun brake link 4 is mounted within the housing 1, and comprises a first arm 21 and a second arm 22. The first arm 21 is arranged to co-operate with the rear end of the draw shaft 2 such that, as the draw shaft 2 moves rearwardly, the arm 21 is also urged rearwardly, such that the brake link 4 pivots clockwise about a pivot pin 5, as will be explained in some detail later. Located on the second arm 22 of the brake link 4 is a connection point 6 for a brake rod 23.

The overrun brake link 4 constitutes a first member which is pivotally mounted at 5 upon a second member in the form of a swinging link 7. The swinging link 7 is pivotally mounted about a pivot pin 10 which is secured to the housing 1. A torsion spring 9 is also mounted about the pivot pin 10, and engages both with the housing 1 and the swinging link 7 to urge the swinging link resiliently in an anti-clockwise direction, into a rest position where the swinging link 7 abuts an abutment 8 which is secured to the housing 1.

A handbrake mechanism includes a handbrake lever 13 which is pivotally secured to the housing 1 by means of a pivot pin 11. Secured to the handbrake lever 13 is a short arm 24, to which one end of a resilient bias means 25 is pivotally secured at 12. The resilient bias means comprises a pair of telescopic sliding tubes 14, which are urged resiliently apart by a heavy compression spring 26. The other end of the resilient bias means 25 is pivotally mounted on the pivot pin 5. A spigot 32 is mounted on the handbrake lever 13, and is adapted to engage a corresponding aperture on a snap retaining catch 33 of spring metal, which is secured to the housing 1. As illustrated in FIG. 1, the handbrake lever 13 is in an "ON" position, being substantially horizontal. When in an "OFF" position, the handbrake lever 13 is substantially upright (and the spring 26 is then as shown in FIG. 1 in chain-dot lines). As the handbrake lever 13 is lowered from its OFF position to its ON position, the spigot 32 runs down an outwardly inclined surface 34 of the retaining catch 33, until it snap engages in the aperture provided therein, thereby to lock the handbrake lever 13 in an ON position.

Operation of the towing coupling with its brake control mechanism will be now be described.

Under normal towing conditions, the draw shaft 2 is firmly connected to the towing vehicle. When the towing vehicle slows down, the draw shaft 2 decelerates correspondingly, and the weight of the trailer pushes the housing 1 forwardly such that, in effect, the draw shaft 2 moves rearwardly relative to the housing 1. The rear end of the draw shaft 2 then abuts the first arm 21 of the brake link 4. Therefore, the brake link 4 pivots in a clockwise manner about the pivot pin 5, applying a force to the brake rod 23 such that the brakes are applied. The further the rearward travel of the draw shaft 2, the greater the travel of the brake rod 23, and the greater the braking force applied. It will be seen that, in the illustrated embodiment, the force applied by the draw shaft 2 is multiplied by the lever ratio of the first arm 21 to the second arm 22. This ratio will depend to some extent upon the precise location of the connection point 6 on the second arm 22, but by way of example, the amplification ratio may be in the range approximately 2:1 to 4:1. Thus far, the operation of the brakes in such an overrun manner is generally similar to the operation of conventional overrun brakes. During pivoting movement of the brake link 4 about the pivot pin 5, the swinging link 7 is urged permanently against the stop 8 by means of the spring 9. In fact, the braking and reaction forces applied to the brake link 4 will tend normally to urge the swinging link 7 against the stop 8 anyway, but the spring 9 serves to ensure that the link 7 does not move momentarily.

In a reversing operation, the draw shaft 2 is pushed rearwardly within the housing 1 to its maximum extent, whereupon the abutment surface of the first arm 21 reaches its rearmost position 21A and the connection point 6 reaches its foremost position 6A. Normally this would apply maximum braking force. However, as outlined above, the automatic reversing brakes are so arranged that, with the trailer wheels moving in a rearward direction, the brake shoes automatically disengage from the brake drums, so that even the maximum rearward travel of the draw shaft 2 is of no effect. This is very useful when reversing is desired, but this mode of operation should be borne in mind when considering subsequent handbrake operation.

When the trailer is parked, the handbrake is applied by moving the handbrake lever 13 from its upright position to its generally horizontal position. In doing this, the heavy compression spring 26 is compressed as the telescopic tubes 14 slide within one another. It is to be appreciated that the resilient bias means 25 operates with a toggle action. That is, as the handbrake lever 13 is moved from its upright position, the pivot point 12 is moved towards the pivot pin 5, the spring 26 being compressed accordingly, until the pivot axes at 5, 11 and 12 are aligned, which is a dead centre position. As the handbrake lever 13 continues to be moved, the pivot point 12 passes over centre, and the force of the spring 26 acts to urge the handbrake lever 13 into its ON position.

When the handbrake lever is fully ON, the heavy compression spring 26 acts as an energy store, and its resilient force acts directly on the pivot pin 5 to urge the swinging link 7 to pivot in a clockwise direction. The first arm 21 of the brake link 4 has an arcuate cut-out portion 28 which conforms to the external contour of the pivot pin 10, and is adapted to bear thereagainst. Therefore, assuming for the present that the draw shaft 2 is not acting at all on the brake link 4, the spring force of the spring 26 is applied equally at the pivot pin 5 to the brake link 4, which also pivots about the pivot pin 10. Now, it is to be appreciated that the lever arm ratio between, on the one hand, the resilient bias means 25 and the pivot pin 10 and, on the other hand, the connection point 6 and the pivot point 10 is always less than 1. Thus, instead of amplifying force (as was the case with the draw shaft 2) the arrangement of levers serves to amplify movement. Thus, by way of example, whereas the lever arm ratio for the brake link 4 acting in normal overrun mode may be about 4:1, the lever arm ratio for the brake link 4 when the handbrake is applied might be 2:3.

The important feature of this handbrake arrangement is that, when the handbrake is ON, there is sufficient energy stored in the spring 26 to move the connection point 6 forwardly of the position 6A, which is its foremost position attainable in normal overrun mode. Thus, the maximum travel of the connection point 6 when the handbrake is applied is greater than that in normal overrun mode. This means that, when the handbrake is applied, it can be ensured that the trailer brakes are always maintained on, even when the trailer is parked facing up-hill and the brakes would otherwise tend to be released by the automatic reversing feature.

In considering the handbrake action above, it was assumed that the draw shaft 2 applied no force whatsoever to the brake link 4. However, it will be appreciated that, even if the draw shaft 2 were urged rearwardly to its rearmost position, then the handbrake action may still operate along the lines described, to urge the connection point 6 forwardly of the position 6A. The only difference would be that the brake link 4 would pivot initially about its abutment point with the rear end of the draw shaft 2, until its curved portion 28 came into abutment with the pivot pin 10.

It will be appreciated that the illustrated towing coupling with brake control mechanism has a number of advantages. It is of simpler and more robust construction than previously known arrangements of which we are aware, and being particularly compact, is readily accommodated within the main housing 1. This may have the advantages of both making the arrangement more safe (exposing fewer moving parts), and protecting the mechanism form outside elements. However, one of the most important advantages from the user's point of view is that there is only the one connection for him to make to the brake rod 23—namely, at the connection point 6. Thus, connecting a brake road to the illustrated mechanism is, from the user's point of view, no more complicated than connecting a brake rod to a conventional towing coupling and brake mechanism. The mechanism incorporates no lost motion arrangements, such that the mechanism as a whole may be more robust, and less prone to frequent adjustments.

It will also be appreciated that, in practice, even though the maximum rearward travel of the first arm 21 of the brake link 4 may be to position 21A, this position will vary in dependence upon the adjustment of the respective brakes. For example, the first arm 21 may move back only as far as position 21B. Then, if the handbrake were applied, the pivot pin 5 would move forwardly to position 5A, representing only a small fraction of the maximum possible movement which may be afforded by the resilient bias means 25.

The illustrated arrangement may be modified in a number of ways. For example, the illustrated arrangement for the brake lever 13 is particularly advantageous in that a tie wire may be connected between the point 29 on the handbrake lever 13 and a point on the towing vehicle. Then, should the towing coupling fail, the wire would operate to pull the handbrake lever 13 automatically into its ON position, the toggle action of the handbrake mechanism serving to ensure that the ON position is obtained and held, with the additional safety feature of the safety catch 33. However, the handbrake mechanism could be alternatively arranged such that the handbrake is OFF when the handbrake lever is generally horizontal, and ON when the handbrake lever is generally vertical. Basically, this can be achieved by disposing the short arm 24 at a different angle to the handbrake lever 13.

In the illustrated arrangement, the compression spring 26 is substantially unstressed when the handbrake lever is OFF. As an alternative, it may be pre-stressed when the handbrake is OFF.

I claim:

1. A brake control mechanism for use with trailers, the mechanism comprising:
   a first member having a connection point for a brake cable or the like and being arranged to co-operate with a push rod of a towing coupling to undergo first pivoting movement about a first pivot point, to actuate brakes in an overrun manner; and
   a handbrake mechanism arranged to cause the first member to undergo second pivoting movement about a second pivot point, such that the maximum travel of said connection point in said second movement is greater than that in said first movement, the handbrake mechanism including means for biasing said first member into a brake-actuating position.

2. A brake control mechanism according to claim 1, further comprising a second member which is mounted for pivoting movement about a third pivot point, the first member being pivotally secured to said second member at said first pivot point.

3. A brake control mechanism according to claim 2, wherein the first member has a portion adapted to abut a pivot pin or the like of said third pivot point, such that when said portion so abuts said pivot pin, said second and third pivot points are substantially coincident.

4. A brake control mechanism according to claim 2, wherein said second member is urged resiliently towards a rest position.

5. A brake control mechanism according to claim 2, wherein said second member is pivotally secured at said third pivot point to a housing of the brake control mechanism.

6. A brake control mechanism according to claim 1, wherein said first member has a first arm arranged to co-operate with a push rod of a towing coupling, and a second arm on which said connection point is located.

7. A brake control mechanism according to claim 1, wherein the bias means comprises a spring.

8. A brake control mechanism according to claim 1, wherein the bias means comprises two sliding members which are urged resiliently towards or away from one another.

9. A brake control mechanism according to claims 7 or 8, wherein the bias means comprises two sliding members urged apart by a compression spring.

10. A brake control mechanism according to claim 1, wherein the bias means has a toggle action.

11. A brake control mechanism according to claim 1, wherein the bias means acts substantially through said first pivot point.

12. A brake control mechanism according to claim 11, comprising at said first pivot point a pivot pin or the like on which are mounted said first member and one end of the bias means.

13. A brake control mechanism according to claim 1, wherein the first and second members and the bias means are housed, at least for the most part, within a housing of the brake control mechanism.

14. A brake control mechanism according to claim 1, wherein the handbrake mechanism includes a handbrake lever.

15. A brake control mechanism according to claim 14, wherein the handbrake mechanism is such that, in use, the handbrake is 'OFF' when the lever is generally upright and 'ON' when the lever is generally horizontal.

16. A brake control mechanism according to claim 14 or 15, wherein the handbrake lever is provided with means whereby it may be tied to a towing vehicle.

17. A towing coupling arrangement provided with a brake control mechanism, the mechanism comprising:
   a first member having a connection point for a brake cable or the like and being arranged to co-operate with a push rod of a towing coupling to undergo first pivoting movement about
   a first pivot point, to actuate brakes in an overrun manner; and
   a handbrake mechanism arranged to cause the first member to undergo second pivoting movement about a second pivot point, such that the maximum travel of said connection point in said second movement is greater than that in said first movement, the handbrake mechanism including means for biasing said first member into a brake-actuating position.

* * * * *